United States Patent
Ha

(10) Patent No.: US 7,726,456 B2
(45) Date of Patent: Jun. 1, 2010

(54) LINEAR CLUTCH SYSTEM FOR VEHICLE AND METHOD FOR CONTROLLING THE SAME

(75) Inventor: Donghyun Ha, Gyeongsangnam-Do (KR)

(73) Assignee: Hyundai Motor Company, Seoul (KR)

( * ) Notice: Subject to any disclaimer, the term of this patent is extended or adjusted under 35 U.S.C. 154(b) by 672 days.

(21) Appl. No.: 11/604,591

(22) Filed: Nov. 27, 2006

(65) Prior Publication Data

US 2007/0131513 A1 Jun. 14, 2007

(30) Foreign Application Priority Data

Dec. 9, 2005 (KR) .................. 10-2005-0120958

(51) Int. Cl.
*F16D 13/50* (2006.01)
*F16D 27/112* (2006.01)

(52) U.S. Cl. ............... 192/90; 192/30 W; 192/84.2; 192/98

(58) Field of Classification Search .............. 192/90
See application file for complete search history.

(56) References Cited

U.S. PATENT DOCUMENTS

| 4,301,883 | A | * | 11/1981 | Collonia ................ 180/179 |
| 5,165,307 | A | * | 11/1992 | Goeckner et al. .......... 477/148 |
| 5,267,635 | A | * | 12/1993 | Peterson et al. ........... 192/90 |
| 5,934,430 | A | * | 8/1999 | Kolomeitsev et al. ....... 192/90 |

* cited by examiner

*Primary Examiner*—Rodney H Bonck
(74) *Attorney, Agent, or Firm*—Morgan, Lewis & Bockius LLP

(57) ABSTRACT

A linear electromotive actuator mounted on an input shaft of a manual transmission clutch system and a clutch operation is controlled by a current signal applied in response to an operating stroke of a clutch pedal. In addition, according to the clutch system and a method for controlling the same, a vehicle weight is reduced and a clutch vibration or an impact can be reduced.

15 Claims, 6 Drawing Sheets

LINEAR CLUTCH SYSTEM FOR VEHICLE AND METHOD FOR CONTROLLING THE SAME

CROSS-REFERENCE TO RELATED APPLICATION

This application claims priority to and the benefit of Korean Patent Application No. 10-2005-0120958 filed in the Korean Intellectual Property Office on Dec. 09, 2005, the entire contents of which are incorporated herein by reference.

FIELD OF THE INVENTION

Generally, the present invention relates to a linear clutch system for a vehicle and a method for controlling the same. More particularly, the linear clutch system including a linear electromotive actuator.

BACKGROUND OF THE RELATED ART

Typically, a clutch system for a manual transmission is for selectively transmitting engine power to a wheel. In addition, a clutch system temporarily cuts off the power when an engine starts or when a gear is shifted. The clutch system is classified into a mechanical type utilizing a rod or a wire and a hydraulic pressure type utilizing hydraulic pressure according to a method of transmitting an operating force.

In a typical manual transmission clutch system, a hydraulic pressure type clutch system includes a clutch master cylinder, a clutch release cylinder, a release bearing, and a release fork. The clutch master cylinder is operated by a clutch pedal that interfaces with the user of the vehicle. The clutch master cylinder is connected to the clutch release cylinder through a hose and a push rod of the clutch release cylinder is connected to the release fork.

When the clutch pedal is operated, the clutch master cylinder, the hose, the clutch release cylinder, the release fork, the clutch release bearing, and a clutch disc are sequentially operated and the engine power to the wheels is cut off. However, a drawback exists in that clutch operating oil is also utilized as brake operating oil, therefore the oil durability can be weak. In addition, because a color of the oil is easily changed by an oil seal abrasion in a hydraulic pressure line, another drawback is that performance is suddenly reduced. Another problem occurs in that a vehicle weight is increased by the elements of the hydraulic pressure line and a hydraulic pressure system. Furthermore, because the clutch master cylinder occupies a wide space, yet another problem occurs in that a mounting position and an operating area of the clutch pedal are limited.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a linear clutch system for a vehicle and a method for controlling the same having advantages of reducing weight and improving durability by applying a linear electromotive actuator. According to an exemplary embodiment of the present invention, a linear clutch system for a vehicle includes a clutch cover secured to a flywheel, a clutch disc splined to an input shaft to selectively transmit power from the flywheel to the input shaft of a transmission. A diaphragm spring is disposed to a rear of the clutch disc such that the clutch disc is selectively contacted to the flywheel. A clutch unit is disposed to a rear of the diaphragm spring, slidably mounted on the input shaft, and including a release bearing connected to the diaphragm spring such that the clutch disc is not contacted to the flywheel. A linear electromotive actuator is disposed to a rear of the release bearing and on an exterior circumference of the input shaft in an axial direction of the input shaft and moving the release bearing in the axial direction of the input shaft in response to a control signal from a controller. Also included is a displacement detector connected to a clutch pedal and outputting a signal to the controller by detecting a stroke of the clutch pedal.

The linear electromotive actuator includes a case body defining a penetration hole such that the transmission input shaft is inserted thereto and a round shaped space portion in the case body, including a flange engaged to a transmission housing in a rear of the case body. An N pole magnetic pipe is also disposed in the space portion and an S pole magnetic pipe, having a diameter bigger than a diameter of the N pole magnetic pipe, is disposed in the space portion at a state that the S pole magnetic pipe is disposed apart from the N pole magnetic pipe at a predetermined distance. A supporting block is formed as a cylindrical shape having a predetermined thickness, disposed between the N pole magnetic pipe and the S pole magnetic pipe, and defining a plurality of operating holes formed in a length direction of the supporting block. Operating coils are inserted into the operating holes and capable of moving back and forth by a current signal from the controller. Also included are operating rods, each including one end connected to the operating coils and the other end disposed outside of the case body. A pushing disk defines a hole such that the input shaft is inserted thereto, one side of the pushing disk is secured to a rear of the release bearing and another side of the pushing disk is connected to the other ends of the operating rods such that the pushing disk integrally moves with the operating coils and the operating rods. Furthermore, a case cover guides the operating rods and is mounted in the front of the case body.

In some embodiments, the case body may be formed of an aluminum alloy material, a reinforced plastic material, combinations thereof, or the like. The operating holes are formed as four holes in a cylindrical direction of the supporting block at a spacing of 90 degrees. The supporting block is formed of a pure iron. A guide bearing supporting the operating rods is disposed to the case cover. The case cover may be formed of an aluminum alloy material, a reinforced plastic material, combinations thereof, or the like. Spacers are respectively disposed in a front and a rear of the operating holes of the supporting block to limit an operating stroke of the operating coils. The spacers are formed of a non-conductive material, such as for example, a plastic. The displacement detector is realized as a variable resistor where a clutch pedal is mounted on a front end of the working rod of the variable resistor. The controller is realized as an engine control unit (ECU) including a control logic to control the linear electromotive actuator on the basis of a detecting signal from the displacement detector. Furthermore, the controller is realized as an engine control unit (ECU) including a control logic to control the linear electromotive actuator on the basis of a detecting signal from the displacement detector.

In some embodiments, a method for controlling a linear clutch system for a vehicle includes determining a current value to be applied to a linear electromotive actuator with respect to a whole stroke of a clutch pedal, a time $\Delta t$ for updating an output value from a displacement detector, and an initial time $t_0$. Also included is calculating an operating stroke of a clutch pedal by utilizing an output signal from the displacement detector and calculating a time $t_n$ by adding up the time $\Delta t$ for updating an output value from the displacement detector with a time $t_{n-1}$. Next, it is determined if the operating stroke value of the clutch pedal is 0 mm at the time $t_n$ and not applying a control current to operating coils of a linear electromotive actuator if the operating stroke value of the clutch pedal is 0 mm. If the operating stroke value of the clutch pedal at the time $t_{n+1}$ is bigger than an operating stroke value at the time $t_n$ in a case that the operating stroke value of the clutch pedal is not 0 mm, a control current is applied in a direction from − to + such that the operating coils move forward by an electromagnetic force if the operating stroke value of the clutch pedal at the time $t_{n+1}$ is bigger than an operating stroke value at the time $t_n$. However, a control current is applied in a direction from + to − such that the operating coils move backward by an electromagnetic force if the operating stroke value of the clutch pedal at the time $t_{n+1}$ is not bigger than an operating stroke value at the time $t_n$.

DETAILED DESCRIPTION OF THE EMBODIMENTS

Figure 1:
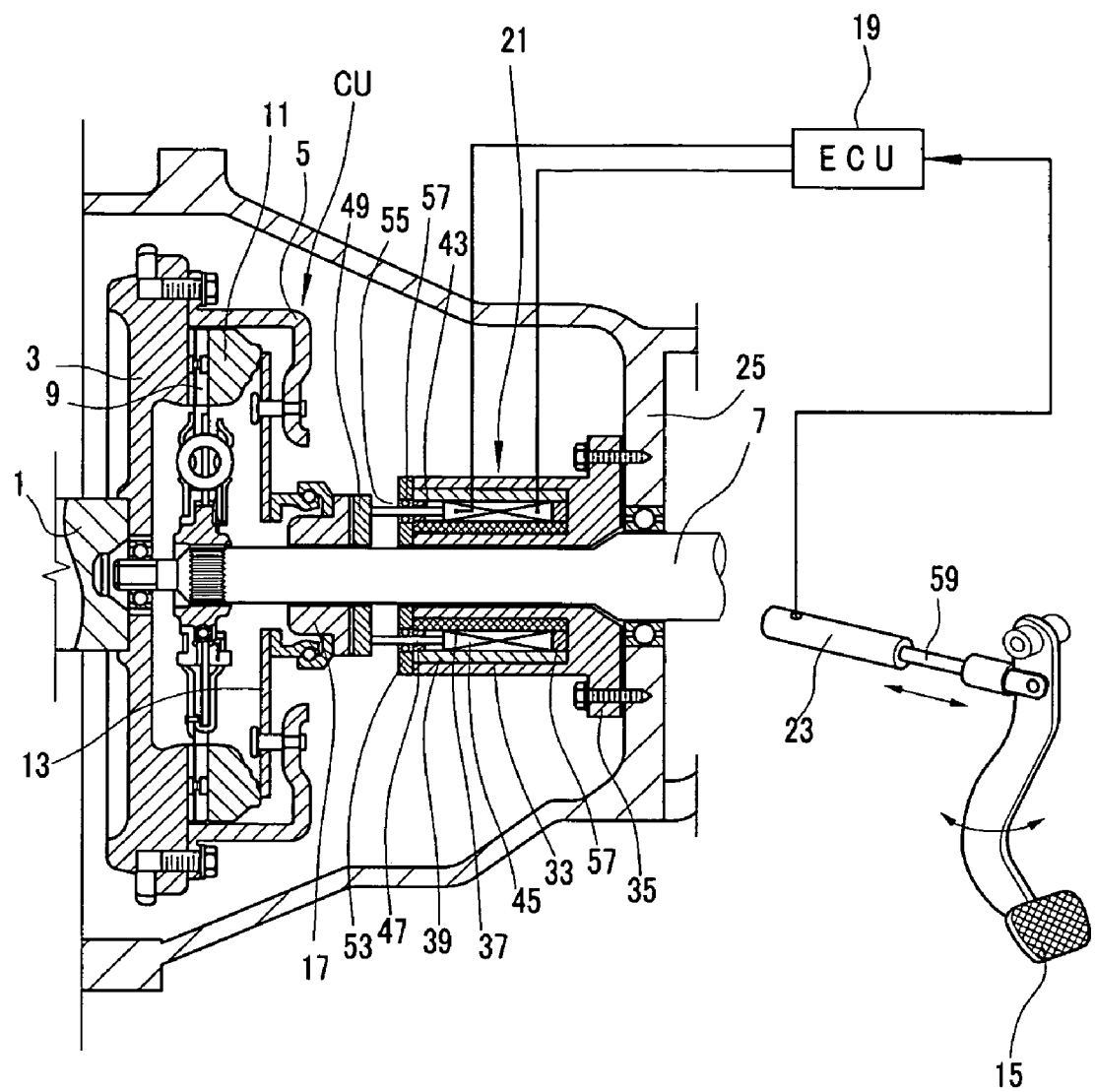
FIG. 1 is a cross-sectional view showing a linear clutch system for a vehicle according to an exemplary embodiment of the present invention.

Exemplary embodiments of the present invention will hereinafter be described in detail with reference to the accompanying drawings. Referring now to FIG. 1, a linear clutch system includes a clutch cover 5, a clutch disc 9, a diaphragm spring 13, a clutch unit CU, a linear electromotive actuator 21, and a displacement detector 23. A flywheel 3 is secured to a crank shaft 1 of an engine to transmit an engine power. The clutch cover 5 is secured to the flywheel 3 and the clutch disc 9 is splined to an input shaft 7 of a transmission to selectively transmit the power from the flywheel 3 to the input shaft 7. The diaphragm spring 13 is disposed to a rear of the clutch disc 9 such that the clutch disc 9 is selectively contacted to the flywheel 3. The clutch unit CU is disposed to a rear of the diaphragm spring 13 and slidably mounted on the input shaft 7. In addition, the clutch unit CU includes a release bearing 17 connected to the diaphragm spring 13 such that the clutch disc 9 is not contacted to the flywheel 3.

The linear electromotive actuator 21 is disposed to a rear of the release bearing 17 and on an exterior circumference of the input shaft 7 in an axial direction of the input shaft 7 and configured to move the release bearing 17 in an axial direction of the input shaft 7 in response to a control signal from a controller 19.

The displacement detector 23 is connected to a clutch pedal 15 and outputs a signal to the controller 19 by detecting a stroke of the clutch pedal 15. That is, according to an exemplary embodiment, the clutch disc 9, the diaphragm spring 13, the clutch unit CU, and the linear electromotive actuator 21 are sequentially disposed in a transmission housing 25. In addition, a pressure plate 11 is disposed between the diaphragm spring 13 and the clutch disc 9 such that an elastic force of the diaphragm spring 13 is transmitted to the clutch disc 9.

Figure 2:
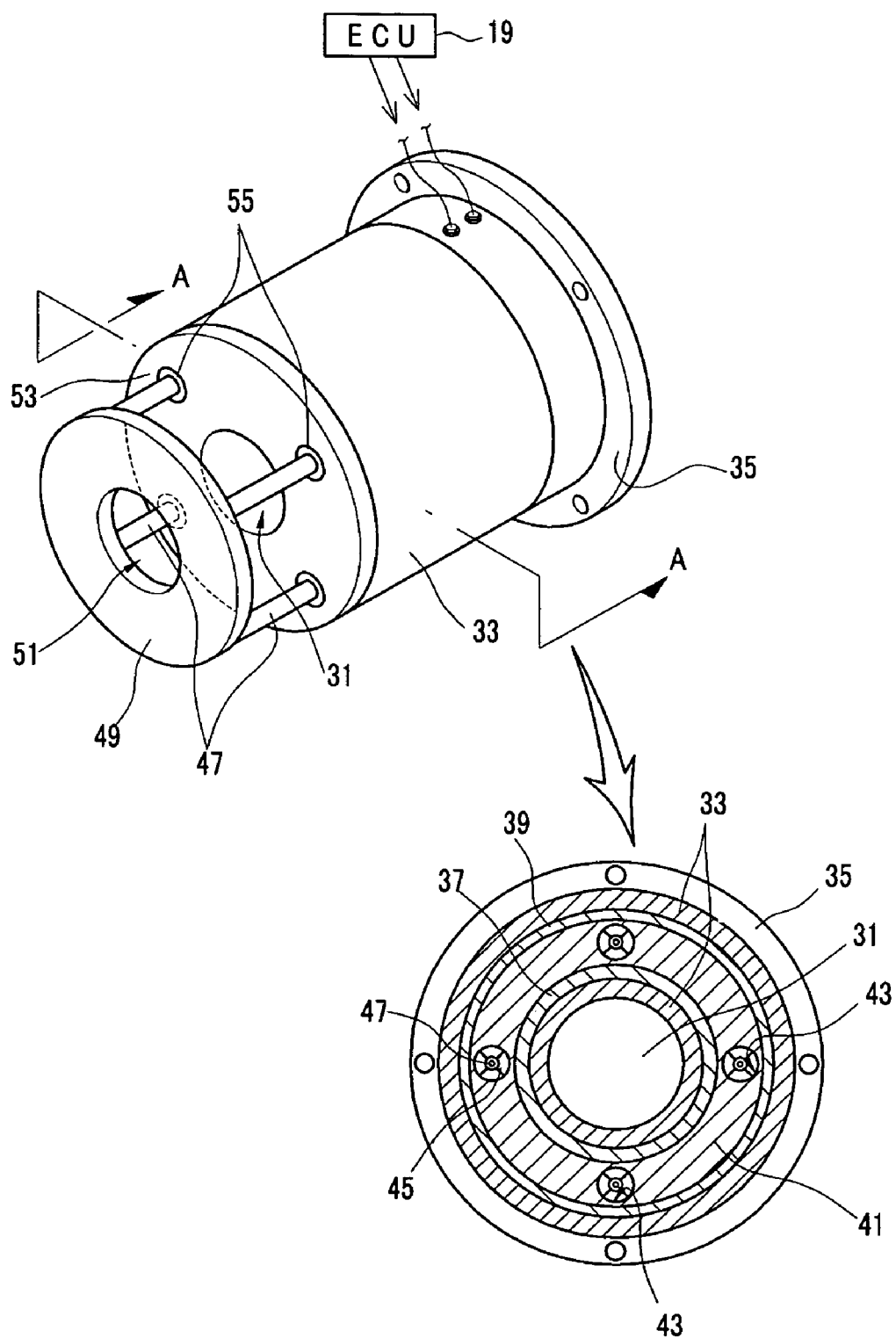
FIG. 2 shows a linear electromotive actuator according to an exemplary embodiment of the present invention.

The linear electromotive actuator 21, as shown in FIG. 2, includes a case body 33, an N pole magnetic pipe 37, a S pole magnetic pipe 39, a supporting block 41, operating rods 47, a pushing disk 49, and a case cover 53. The case body 33 defines a penetration hole 31 such that the transmission input shaft 7 is inserted thereto. The case body 33 also defines a round shaped space portion along the circumference direction. In addition, a flange 35 is integrally formed to a rear of the case body 33, which is engaged by a bolt to the transmission housing 25.

The N pole magnetic pipe 37 is mounted by being inserted along an interior surface in the space portion of the case body 33. In addition, the S pole magnetic pipe 39, having a diameter bigger than a diameter of the N pole magnetic pipe 37, is inserted into the space portion. The S pole magnetic pipe 39 is disposed at a state that the S pole magnetic pipe 39 is disposed apart from the N pole magnetic pipe 37 at a predetermined distance. In addition, the supporting block 41 is inserted in the space portion between the N pole magnetic pipe 37 and the S pole magnetic pipe 39.

The supporting block 41 is formed as a cylindrical shape having a predetermined thickness and defines a plurality of operating holes 43 formed in a length direction of the supporting block 41. According to an exemplary embodiment, the plurality of operating holes 43 may be formed as four in a cylindrical direction of the supporting block 41 at a space of 90 degrees.

Operating coils 45 are inserted to the respective operating holes 43 and move back and forth by a current signal from the controller 19 according to Fleming's left hand rule. In addition, one end of each of the operating rods 47 is connected to a respective operating coil 45 and the other end of each operating rod 47 is disposed outside of the case body 33 such that the other end is connected to the pushing disk 49.

The pushing disk 49 defines a hole 51 in a central portion thereof such that the input shaft 7 is inserted into the hole 51. In some embodiments, the hole 51 can be formed as a circular shape. In addition, the pushing disk 49 is secured to a rear of the release bearing 17. That is, the pushing disk 49 is connected to the four other ends of the operating rods 47 to integrally move with the operating coils 45 and the operating rods 47. In other words, an operating force of the operating coils 45 is transmitted to the release bearing 17. In addition, respective operating rods 47 are supported and guided by the case cover 53 mounted in a front of the case body 33. Furthermore, the case cover 53 opens and closes the operating holes 43.

In some embodiments, guide bearings 55, in which the operating rods 47 are inserted, are mounted to the case cover 53 to support the operating rods 47. Spacers 57 limiting the operating stroke of the operating coils 45 may be mounted in a front and a rear of the operating holes 43 of the supporting block 41.

If a current signal is applied to the operating coils 45, an electromagnetic force F is generated in response to a direction of the current I according to Fleming's left hand rule. Therefore, the operating coils 45 can be moved back and forth in a direction of the electromagnetic force F. That is, a magnetic field having a magnetic flux B is formed in a direction from the N pole magnetic pipe 37 to the S pole magnetic pipe 39. Thus, if the current I flows in the operating coils 45 in the magnetic field, the operating coils 45 move in a direction of the electromagnetic force F by the electromagnetic force F.

According to some embodiments, the case body 33 and the case cover 53 may be formed of an aluminum alloy or a reinforced plastic such that a linear electromagnetic force F is formed. On the contrary, the supporting block 41 may be formed of a pure iron such that magnetic field forming efficiency is improved between the N pole magnetic pipe 37 and the S pole magnetic pipe 39.

At times that the operating coils 45 operate, the magnetic flux B is formed non-linearly at both ends of the operating stroke, i.e., at both ends of the operating holes 43 in a length direction. Spacers 57 are disposed at both ends of the operating holes 43 such that the operating coils 45 are not located in sections in which the non-linear electromagnetic force F is formed. The spacers 57 have a filtering operation eliminating the sections forming the non-linear forces disturbing a linear motion of the operating coils 45. Therefore, the spacers 57 may be formed of a non-conductive material such as a plastic that is not affected by the magnetic field.

A front end of the working rod 59 of the variable resistor 23 is connected to the clutch pedal 15 by a hinge. The controller 19 outputs a control signal for operation to the linear electromotive actuator 21 in response to the operating stroke of the clutch pedal 15 by receiving a detecting signal of the variable resistor 23 that is the displacement detector. In some embodiments, the controller 19 may be realized as at least one microprocessor operated by a predetermined program and the predetermined program can be programmed to include a set of instructions to perform steps in a method according to an exemplary embodiment of the present invention, which will later be described in more detail. In addition, the controller 19 may be realized as an engine control unit (ECU).

Figure 3:
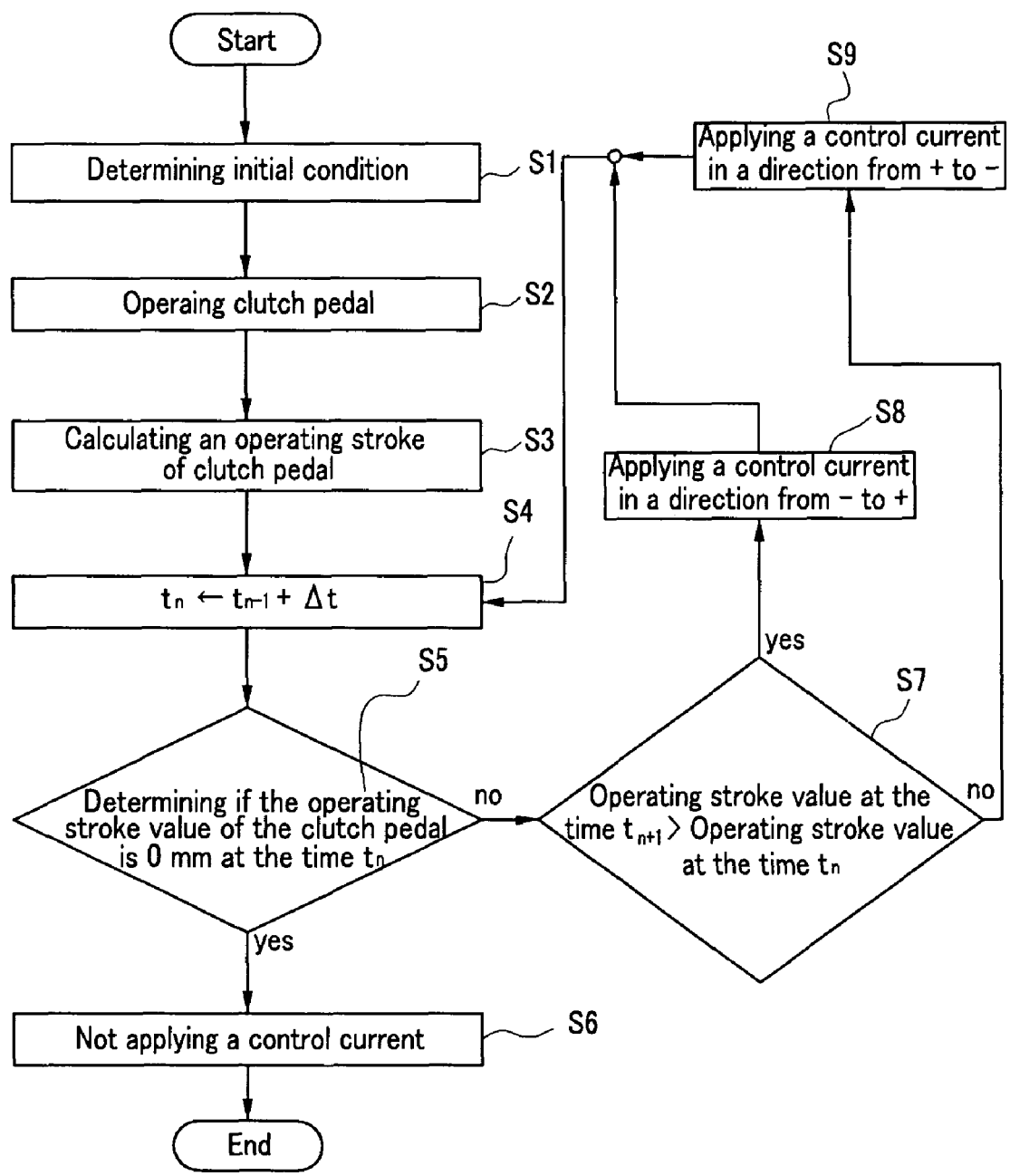
FIG. 3 and FIG. 4 show a method for controlling a linear clutch system for a vehicle and a principle of calculating an update time by reading an output value of a variable resistor according to an exemplary embodiment of the present invention.

Referring to FIGS. 3-6, a method for controlling the linear clutch system for a vehicle will now be described. As shown in FIG. 3, first, the controller 19 determines a current value to be applied to the operating coils 45 of the linear electromotive actuator 21 with respect to a whole stroke of a clutch pedal 15. Next, the controller 19 determines a time $\Delta t$ for updating an output value of the variable resistor 23 transmitted to the controller 19 and an initial time $t_0$ at step S1. Initial time to is the time when the stroke value of the clutch pedal 15 is 0 mm, and the time $\Delta t$ and the initial time $t_0$ are called an initial condition. After the initial condition is predetermined, if a driver operates the clutch pedal 15 at step S2, the controller 19 calculates the operating stroke of the clutch pedal 15 by utilizing the output signal from the variable resistor 23 at step S3. Then the controller 19 calculates a time $t_1$ by adding up the time $\Delta t$ with the time $t_0$ at step S4. That is, the controller 19 calculates a time $t_n$ by adding up the time $\Delta t$ with the time $t_{n-1}$ at the step S4. Next, the controller 19 determines if the operating stroke value of the clutch pedal is 0 mm at step S5.

Figure 4:
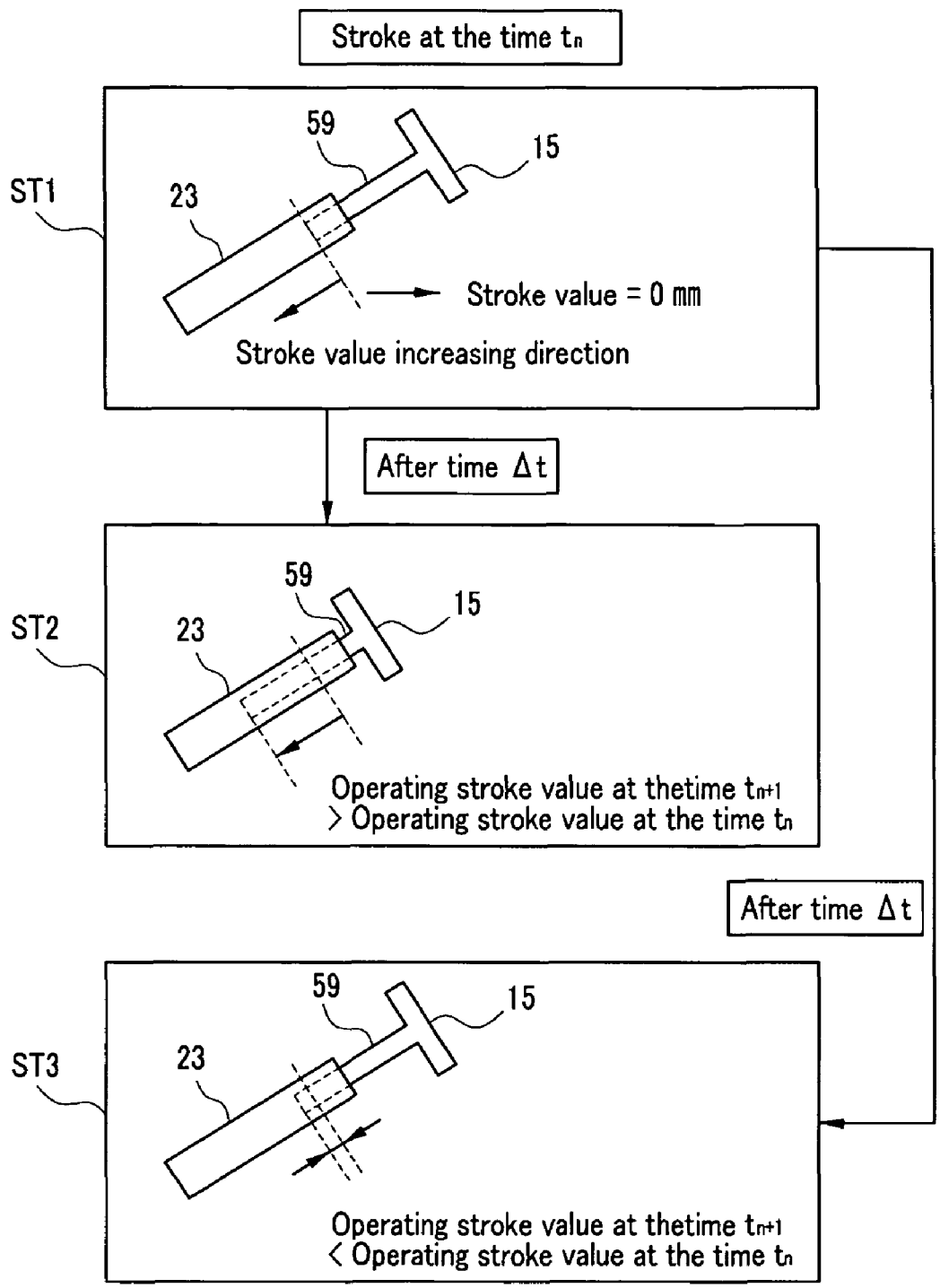

At the step S5, the controller does not apply a control current to the operating coils 45 of the linear electromotive actuator 21 if the operating stroke value of the clutch pedal 15 is 0 mm at step S6 (referring to ST1 in FIG. 4).

Figure 5:
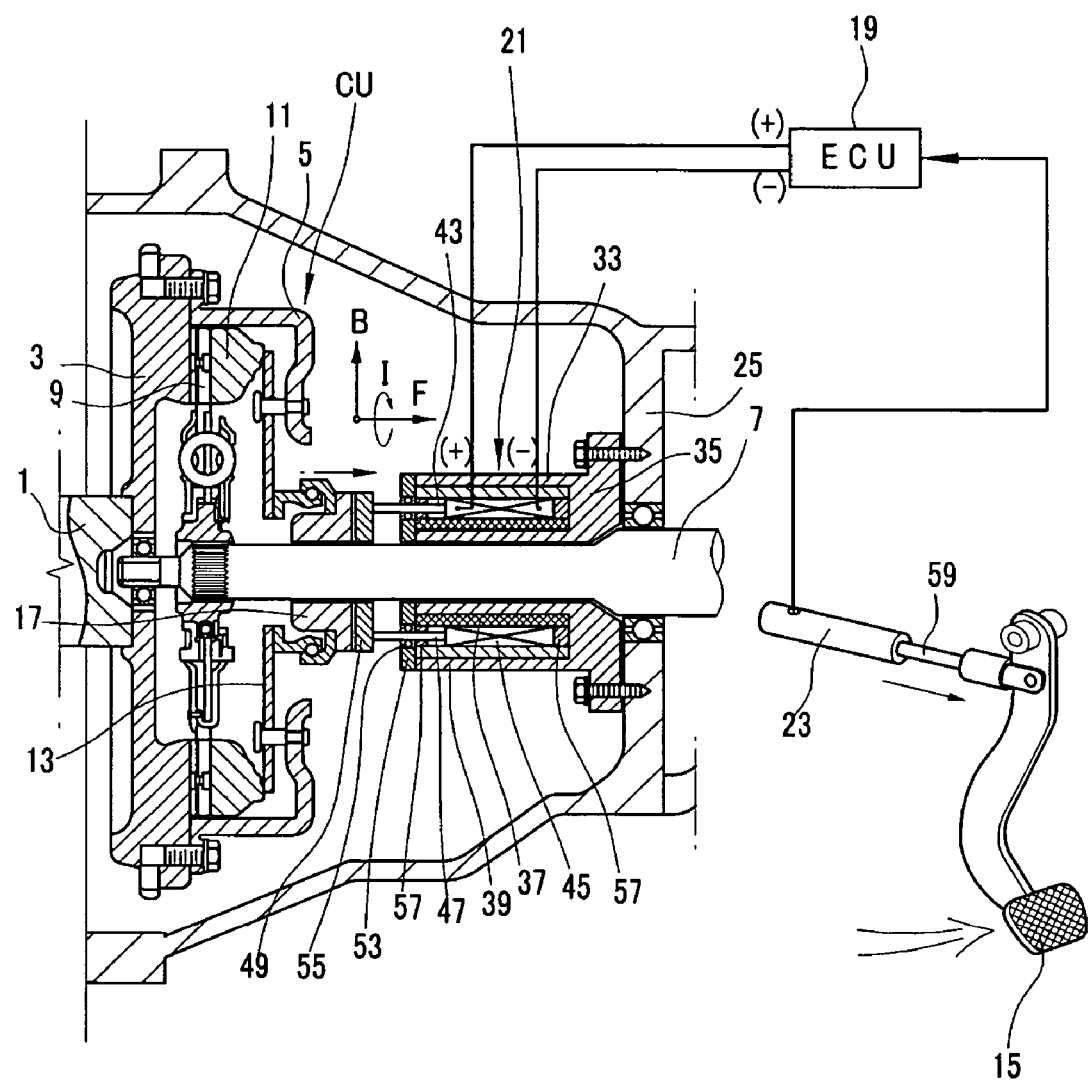
FIG. 5 and FIG. 6 show an operation of a linear clutch system according to an exemplary embodiment of the present invention.

If the state described above is realized before the clutch pedal 15 is initially operated, as shown in FIG. 5, a state that the clutch disc 9 is contacted to the flywheel 3 may be continued at a state that the operating coils 45 move backward. In addition, at the step S5, if the operating stroke value of the clutch pedal 15 is not 0 mm, the controller 19 determines if an operating stroke value of the clutch pedal 15 at the time $t_{n+1}$ is bigger than an operating stroke value at the time $t_n$ at step S7. Therefore, at the step S7, if the operating stroke value of the clutch pedal 15 at the time $t_{n+1}$ is bigger than the operating stroke value of the clutch pedal 15 at the time $t_n$, the controller 19 applies a control current in a direction from − to + such that the operating coils 45 move forward by the electromagnetic force at step S8. In this case, because the driver steps on the clutch pedal 15 for more than the time $t_n$ (referring to ST1→ST2 in FIG. 4), the controller 19 applies the control current in a direction from − to + such that the operating coils 45 move forward at the step S8.

Figure 6:
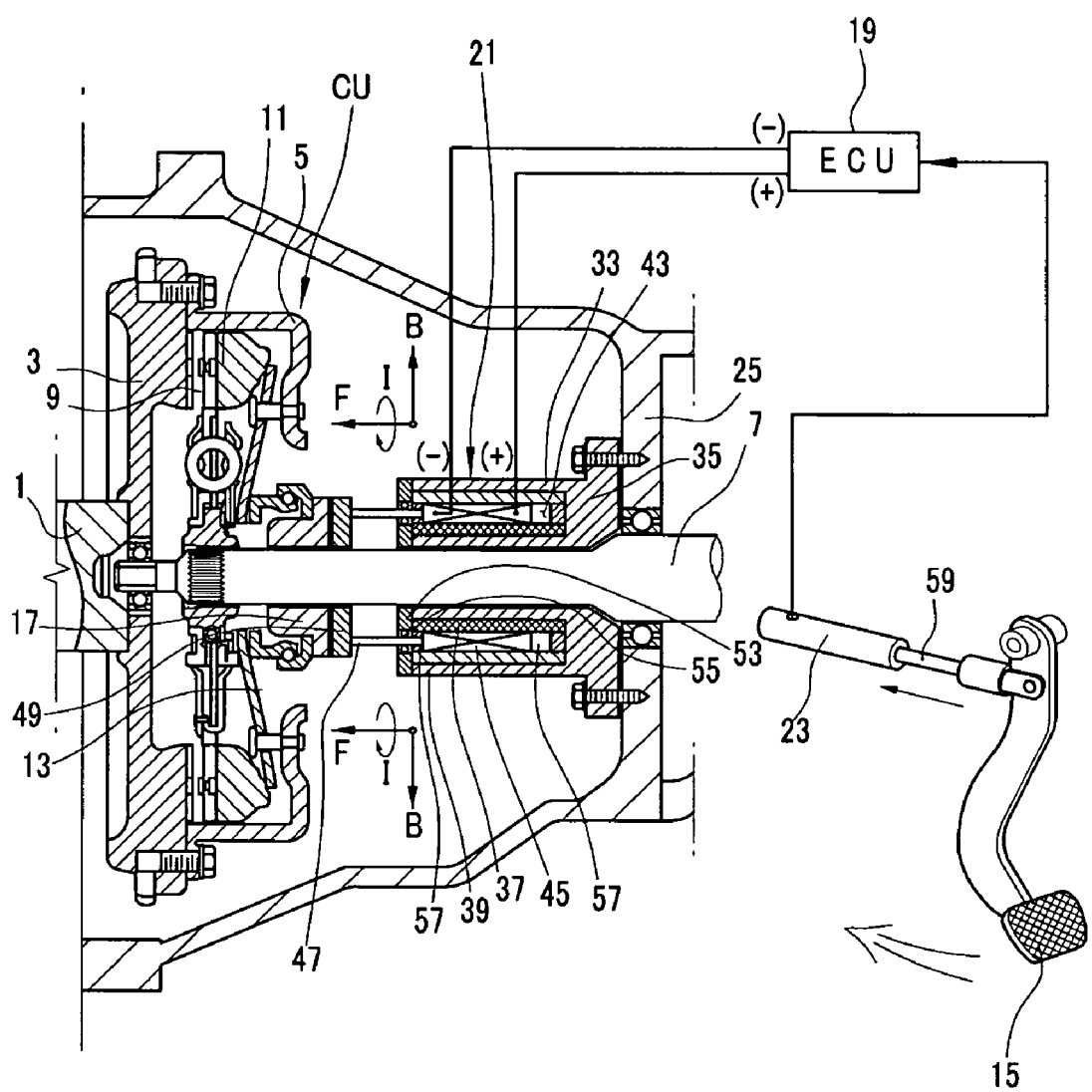

In other embodiments, the controller 19, as shown in FIG. 6, applies the control current in a direction from − to + to the operating coils 45 such that the current I flows in a clockwise direction when the operating coils 45 are shown from the front. Therefore, the operating coils 45 push the release bearing 17 by the electromagnetic force F generated in a forward direction, i.e., a direction of the release bearing 17 in the magnetic field having the magnetic flux B from the N pole magnetic pipe 37 to the S pole magnetic pipe 39. An elastic force applied to the clutch disc 9 is released by the release bearing 17 pushing the diaphragm spring 13. That is, a power delivery between the flywheel 3 and the clutch disc 9 is cut off.

On the contrary, in the step S7, if the operating stroke value of clutch pedal 15 at time $t_{n+1}$ is not bigger than the operating stroke value of clutch pedal 15 at the time $t_n$, controller 19 applies a control current in a direction from + to − such that operating coils 45 move backward by the electromagnetic force at step S9. That is, when the driver steps on the clutch pedal 15 for less than the time $t_n$ (referring to ST1→ST3 in FIG. 4), the controller 19 applies the control current in a direction from + to − such that the operating coils 45 move backward at the step S9. More particularly, the controller 19, as shown in FIG. 5, applies the control current in a direction from + to − to the operating coils 45 such that the current I flows in a counter clockwise direction when the operating coils 45 are shown from the front. As a result, operating coils 45 push the release bearing 17 by electromagnetic force F generated in a backward direction, i.e., a contrary direction of the release bearing 17 in the magnetic field having the magnetic flux B from the N pole magnetic pipe 37 to the S pole magnetic pipe 39. Therefore, the release bearing 17 releases the diaphragm spring 13. That is, the diaphragm spring 13 transmits the elastic force to the clutch disc 9 so that a power is transmitted from the flywheel 3 to the clutch disc 9.

As described, a linear electromotive actuator is applied and a clutch operation is controlled on the basis of a current signal applied in response to an operating stroke of the clutch pedal. In additional embodiments, an -optical clutch system having non-hysteresis characteristics can be provided and productivity can be improved because a variable resistor and a linear electromotive actuator are utilized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A linear clutch system for a vehicle, comprising:
   a clutch cover, a front portion of which is secured to a flywheel;
   a clutch disc disposed between the flywheel and a rear portion of the clutch cover and splined to an input shaft to selectively transmit power from the flywheel to the input shaft of a transmission;
   a diaphragm spring disposed between the clutch disc and the rear portion of clutch cover such that the clutch disc is selectively contacted to the flywheel;

a clutch unit disposed to a rear portion of the diaphragm spring, slidably mounted on the input shaft, and comprising a release bearing connected to the rear portion of the diaphragm spring such that the clutch disc does not contact the flywheel;

a linear electromotive actuator disposed to a rear portion of the release bearing and on an exterior circumference of the input shaft in an axial direction of the input shaft and moving the release bearing in the axial direction of the input shaft in response to a control signal from a controller; and a displacement detector connected to a clutch pedal for outputting a signal to the controller by detecting a stroke of the clutch pedal, wherein the linear electromotive actuator comprises:

a case body defining a penetration hole such that the input shaft is inserted thereto and a round shaped space portion in the case body, and comprising a flange engaged to a transmission housing in a rear portion of the case body;

a N pole magnetic pipe disposed in the space portion;

a S pole magnetic pipe having a diameter bigger than a diameter of the N pole magnetic pipe and disposed in the space portion at a state that the S pole magnetic pipe is disposed apart from the N pole magnetic pipe at a predetermined distance;

a supporting block formed as a cylindrical shape having a predetermined thickness, disposed between the N pole magnetic pipe and the S pole magnetic pipe, and defining a plurality of operating holes formed in a length direction of the supporting block;

operating coils inserted into the operating holes wherein the operating coils are configured to move back and forth by a current signal from the controller;

operating rods having one end connected to the operating coils and the other end disposed outside of the case body;

a pushing disk defining a hole such that the input shaft is inserted thereto, one side of the pushing disk secured to a portion of the release bearing and another side of the pushing disk connected to the other ends of the operating rods such that the pushing disk integrally moves with the operating coils and the operating rods; and a case cover guiding the operating rods and mounted in a front portion of the case body.

2. The system of claim 1, wherein the case body comprises aluminum alloy material.

3. The system of claim 1, wherein the case body comprises reinforced plastic material.

4. The system of claim 1, further comprising four operating holes formed in a cylindrical direction spaced apart by 90 degrees in the supporting block.

5. The system of claim 1, wherein the supporting block comprises an iron material.

6. The system of claim 1, further comprising a guide bearing supporting the operating rods, wherein the guide bearing is disposed to the case cover.

7. The system of claim 1, wherein the case cover comprises aluminum alloy material.

8. The system of claim 1, wherein the case cover comprises reinforced plastic material.

9. The system of claim 1, further comprising spacers respectively disposed in a front and a rear of the operating holes of the supporting block to limit an operating stroke of the operating coils.

10. The system of claim 9, wherein the spacers comprise a non-conductive material.

11. The system of claim 10, wherein the non-conductive material is a plastic.

12. The system of claim 1, wherein the displacement detector is realized as a variable resistor where a clutch pedal is mounted on a front end of the working rod of the variable resistor.

13. The system of claim 1, wherein the controller is realized as an engine control unit (ECU) comprising a control logic to control the linear electromotive actuator on the basis of a detecting signal from the displacement detector.

14. The system of claim 1, wherein the controller is realized as an engine control unit (ECU) comprising a control logic to control the linear electromotive actuator on the basis of a detecting signal from the displacement detector.

15. A method for controlling a linear clutch system for a vehicle comprising:

determining a current value to be applied to a linear electromotive actuator with respect to a whole stroke of a clutch pedal, a time $\Delta t$ for updating an output value from a displacement detector, and an initial time t;

calculating an operating stroke of a clutch pedal by utilizing an output signal from the displacement detector;

calculating a time $t_n$ by adding up the time $\Delta t$ for updating an output value from the displacement detector with a time $t_{n-1}$;

determining if the operating stroke value of the clutch pedal is 0 mm at the time $t_n$;

not applying a control current to operating coils of a linear electromotive actuator if the operating stroke value of the clutch pedal is 0 mm;

determining if the operating stroke value of the clutch pedal at the time $t_{n+1}$ is bigger than an operating stroke value at the time $t_n$ in a case that the operating stroke value of the clutch pedal is not 0 mm;

applying a control current in a direction from − to + such that the operating coils move forward by an electromagnetic force if the operating stroke value of the clutch pedal at the time $t_{n+1}$ is bigger than an operating stroke value at the time $t_n$; and applying a control current in a direction from + to − such that the operating coils move backward by an electromagnetic force if the operating stroke value of the clutch pedal at the time $t_{n+1}$ is not bigger than an operating stroke value at the time $t_n$.

* * * * *